US008700442B2

(12) United States Patent
Takaoka

(10) Patent No.: US 8,700,442 B2
(45) Date of Patent: Apr. 15, 2014

(54) OPERATING DEVICE AND IMAGE FORMING APPARATUS

(75) Inventor: Toshimasa Takaoka, Osaka (JP)

(73) Assignee: Kyocera Mita Corporation (JP)

( * ) Notice: Subject to any disclaimer, the term of this patent is extended or adjusted under 35 U.S.C. 154(b) by 428 days.

(21) Appl. No.: 13/017,138

(22) Filed: Jan. 31, 2011

(65) Prior Publication Data

US 2011/0205234 A1    Aug. 25, 2011

(30) Foreign Application Priority Data

Feb. 24, 2010    (JP) ................................. 2010-038958

(51) Int. Cl.
G06F 3/12    (2006.01)
(52) U.S. Cl.
USPC .......... 705/7.27; 358/1.11; 358/1.18; 358/1.9
(58) Field of Classification Search
CPC .............................. G06F 3/1297; G06F 3/1205
USPC ....................................................... 705/7.27
See application file for complete search history.

(56) References Cited

U.S. PATENT DOCUMENTS

| 6,282,687 | B1* | 8/2001 | Maeda et al. ................. 714/763 |
| 6,349,304 | B1* | 2/2002 | Boldt et al. ............................ 1/1 |
| 7,336,265 | B2* | 2/2008 | Tamura et al. ................. 345/173 |
| 2002/0114007 | A1* | 8/2002 | Hayashi ....................... 358/1.18 |
| 2004/0024744 | A1* | 2/2004 | Yamada ............................ 707/1 |
| 2006/0238786 | A1* | 10/2006 | Sakura et al. .................. 358/1.9 |
| 2006/0239708 | A1* | 10/2006 | Kozuka et al. .................. 399/75 |
| 2007/0005561 | A1* | 1/2007 | Sakura et al. ...................... 707/1 |
| 2007/0057426 | A1* | 3/2007 | Tao et al. .................... 270/58.09 |
| 2007/0146759 | A1* | 6/2007 | Saito ............................ 358/1.13 |
| 2007/0263240 | A1* | 11/2007 | Hirai ............................ 358/1.11 |
| 2009/0009810 | A1* | 1/2009 | Noda et al. ................... 358/1.18 |
| 2009/0049541 | A1* | 2/2009 | Ban ................................ 726/17 |
| 2009/0316184 | A1* | 12/2009 | Ohyama et al. .............. 358/1.15 |
| 2010/0007902 | A1* | 1/2010 | Kikuchi ......................... 358/1.9 |

FOREIGN PATENT DOCUMENTS

JP    2001-47708    2/2001

OTHER PUBLICATIONS

"Printing Revolution New Machines Promise to Outdate Newspaper Methods, Simplify Jobs", by Howard Rutledge, Wall Street Journal, Jan. 13, 1948.*
"A New Generalized Model for Information Transfer: A System Approach", by Frieda B. Libaw, American Documentation, Oct. 1969; 20, 4; Proquest Centrol p. 381.*
"Image Processing on MPP-Like Arrays (Massively Parallel Processor)", by Neil Boyd Coletti, University of Illionis at Urbana—Champaign; ProQuest Dissertations and Theses; 1983.*

(Continued)

Primary Examiner — Scott L Jarrett
Assistant Examiner — Pan Choy
(74) Attorney, Agent, or Firm — Gerald E. Hespos; Michael J. Porco; Matthew T. Hespos

(57) ABSTRACT

An operating device includes a receiving section for, when set values using respective reception screens relating to a further workflow selected in a selection input section are input, receiving these set values and set values input using respective reception screens relating to a workflow previously selected in the selection input section as set values applied for a series of functions as a combination of the selected further workflow and the workflow previously selected in the selection input section.

3 Claims, 8 Drawing Sheets

(56) References Cited

OTHER PUBLICATIONS

"Color Printers: The Full Spectrum", by Melissa Riofrio, InfoWorld; Apr. 5, 2004; 26, 14; ProQuest Central, p. 42.*

"Xeros ColorQube 9201/9202/9203 Quick User Guide", Xerox Corporation, Jul. 2009.*

"Konica Minolta, Workflow Results for Education", 2010, Rochester Software Associates, Inc. 69 Cascade Drive, Rochester, New York 14614.*

"Outstanding Production Power", Ricoh Europe PLC., 2009.*

"Xerox FreeFlow Output Manager: Multiple Printers Working as One—Automatically", Xerox Corporation, 2008.*

"Xerox WorkCentre 5225/5230 Multifunction Printers Evaluator Guide", Xerox Corporation, 2010.*

"Xerox WorkCentre 5735/5740/5745/5755/5765/5775/5790 System Administrator Guide Version 2.0", Xerox Corporation, Dec. 2010.*

"Sharp ATI-Q-Document management", Advanced Technologies International, Sharp Corporation 2009.*

"DocSystem Advanced Rules-Based Distributed Print and Departmental Workflow", Prism Software, 2006.*

* cited by examiner

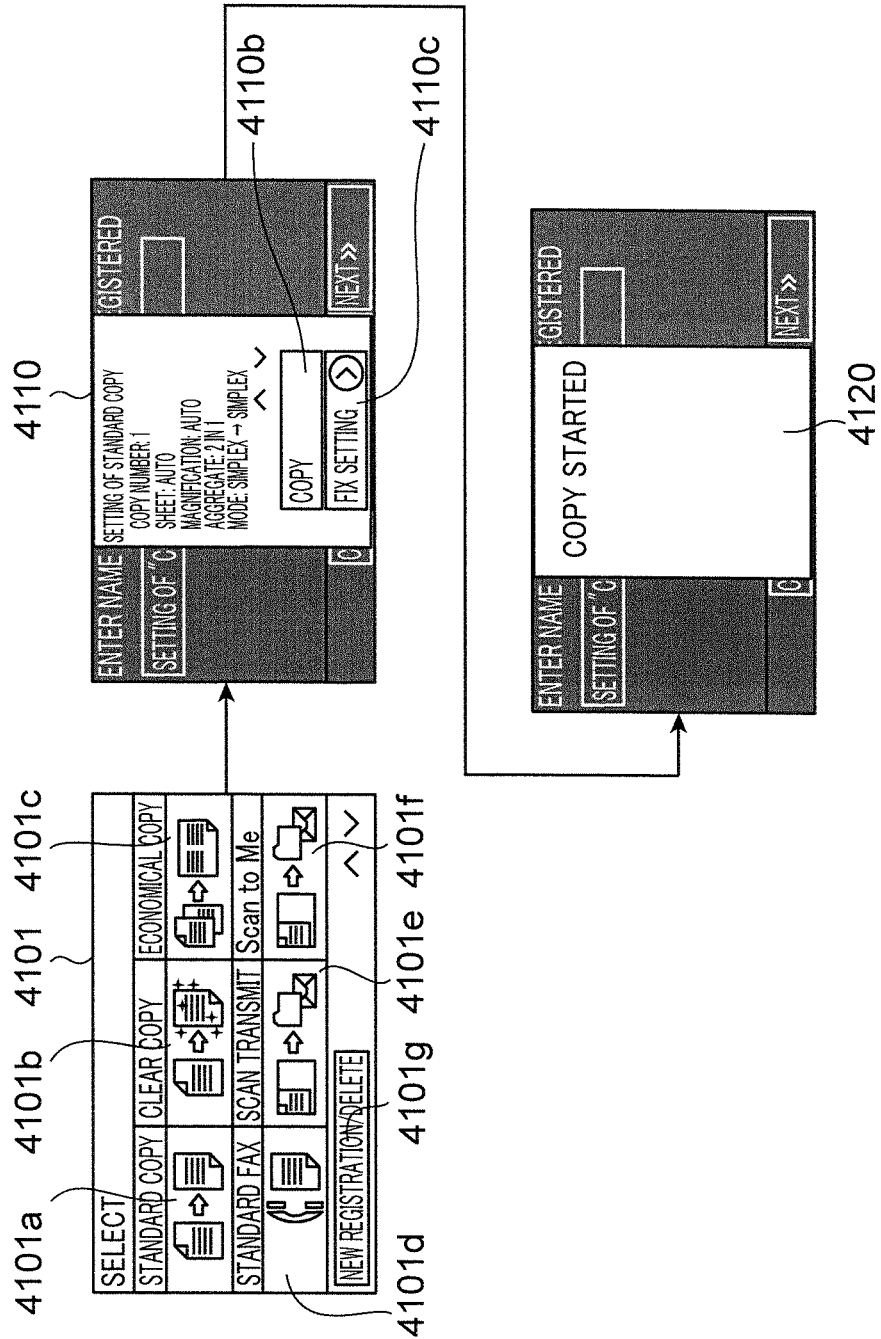

OPERATING DEVICE AND IMAGE FORMING APPARATUS

BACKGROUND OF THE INVENTION

1. Field of the Invention

The present invention relates to a technology for storing settings for functions executable in an image forming apparatus in the image forming apparatus.

2. Description of the Related Art

In some of conventionally known image forming apparatuses, function setting screens (reception screens) are displayed in a wizard format (user interactive format) on a display unit to improve operability at the time of function execution by a user, for example, upon setting sheet size, magnification, density, aggregate print and document image quality applied during a copying operation. According to this, the user registers contents of the settings applied during the copying operation as a workflow in the image forming apparatus more easily than before by following guidance by the respective screens successively switched and displayed on the display unit.

SUMMARY OF THE INVENTION

The present invention is a further improvement of the above prior art.

Specifically, the present invention is directed to an operating device, an operating device, comprising a display unit; a storage that stores one or more workflows each composed of a combination of a predetermined plurality of processing items out of a plurality of processing items of an image forming apparatus including the operating device; a first selection input section that inputs selection of a workflow designated by a user out of the workflows stored in the storage; a display controller that causes the display unit to display a plurality of reception screens used to input respective set values for the respective processing items in a display format predetermined for each workflow; and a receiving section that receives set values when the set values are input using the respective reception screens relating to the workflow selected in the first selection input section, wherein the first selection input section receives input of selection of a further workflow after the receiving section completes the reception of the input of the set values on the respective reception screens relating to the workflow selected in the first selection input section; and when set values are input using respective reception screens relating to the further workflow selected by the first selection input section, the receiving section receives these set values and the set values input using the respective reception screens relating to the workflow previously selected in the first selection input section as set values applied for a series of functions as a combination of the selected further workflow and the workflow previously selected in the first selection input section.

These and other objects, features and advantages of the present invention will become more apparent upon reading the following detailed description along with the accompanying drawings.

BRIEF DESCRIPTION OF THE DRAWINGS

FIG. 8 is a diagram showing a transition of display screens at the time of calling a workflow for causing the copy function to be displayed in a list format.

DETAILED DESCRIPTION OF THE PREFERRED EMBODIMENTS

Figure 1:
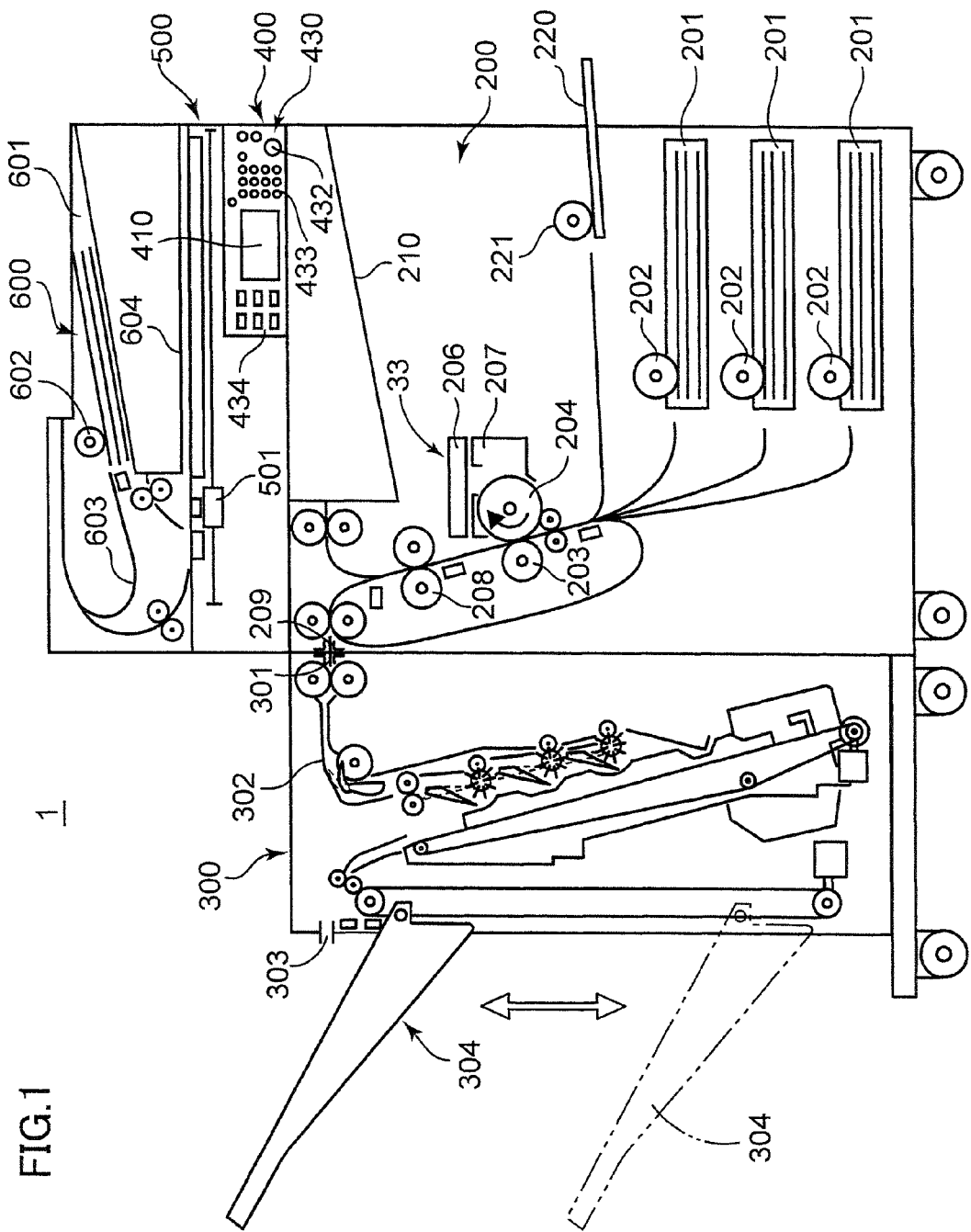
FIG. 1 is a schematic side view showing an exemplary construction of an image forming apparatus including an operating device according to the invention.
Figure 2:
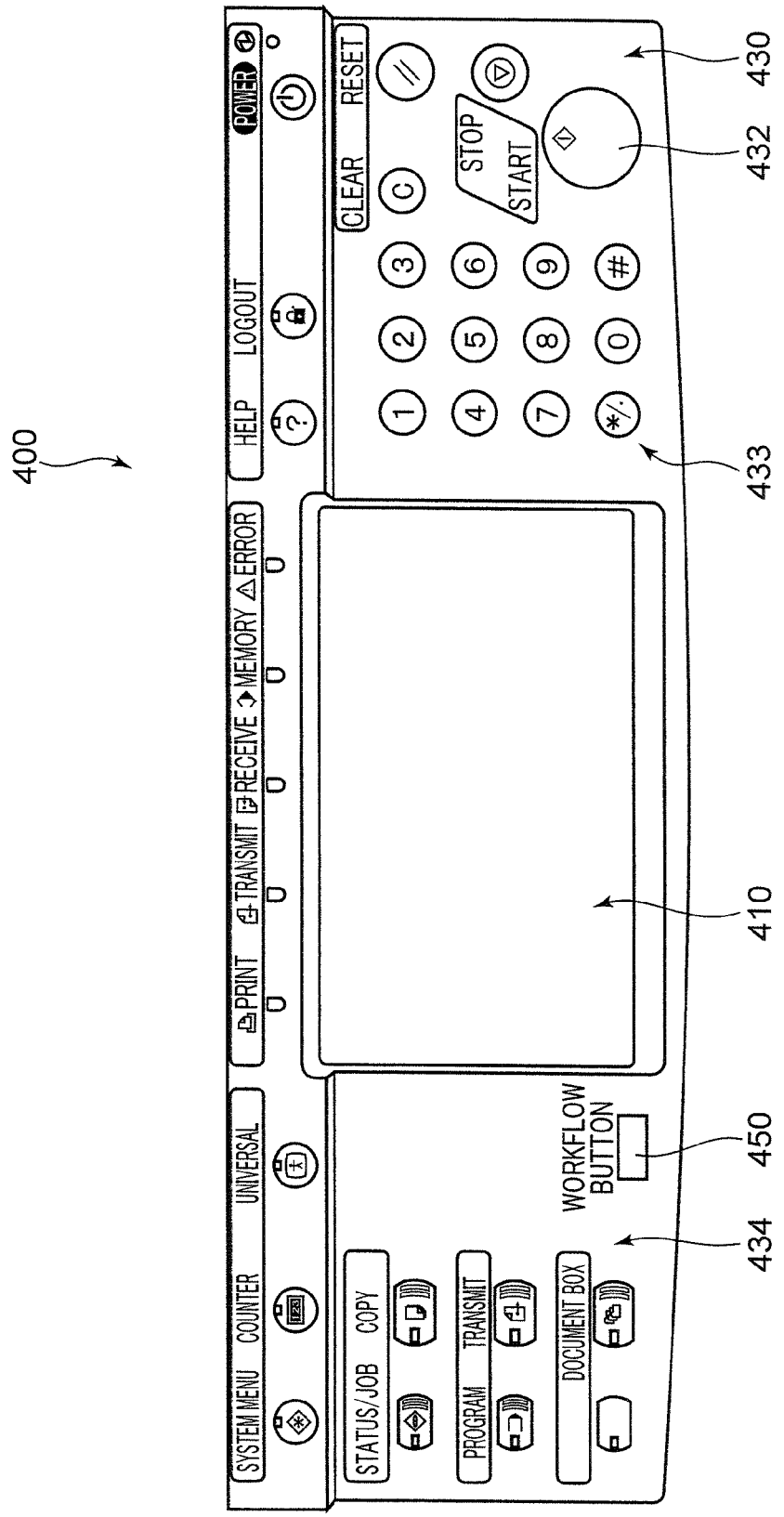
FIG. 2 is a partial enlarged view of an operation unit.

Hereinafter, an operating device and an image forming apparatus according to the present invention are described. FIG. 1 is a schematic side view showing an exemplary construction of an image forming apparatus including an operating device according to the present invention. FIG. 2 is a partial enlarged view of an operation unit 400.

The image forming apparatus 1 shown in FIG. 1 is a complex machine having a scanner function, a facsimile function, a printer function, a copy function and other functions and provided with a main unit 200, a sheet post-processing unit 300 arranged on a sheet carry-out side, e.g. on the left side of the main unit 200, an operation unit 400 used by an operator to enter various operation instructions and the like, a document reading unit 500 arranged on the main unit 200 and a document feeding unit 600 arranged on the document reading unit 500.

As shown in FIG. 2, the operation unit 400 includes a display unit 410 composed of an LCD (Liquid Crystal Display) and the like, and an operation key unit 430 used by the operator to enter operation instructions. The operation key unit 430 includes a start key 432, a numerical pad 433, function changeover keys 434 and the like.

The start key 432 receives instructions from the operator to start respective operations such as a copying operation and a scanning operation. The numerical pad 433 includes keys for receiving instructions designating the number of copies and the like from the operator. The function changeover keys 434 are keys for receiving instructions from the operator to switch the function among the scanner function, the facsimile function, the printer function and the copy function. The display unit 410 includes a touch panel unit composed of the LCD (Liquid Crystal Display) and the like and having a touch panel function. The display unit 410 can display various reception screens and enables the operator to enter execution commands of various functions by touching a display surface (displayed operation keys).

A workflow button 450 is a button for receiving input of an instruction to start a workflow operation for executing the function such as the copying operation or the scanning operation with contents set beforehand by a user and an instruction to start a process of registering, changing or deleting the workflow operation.

Referring back to FIG. 1, the document feeding unit 600 includes a document placing portion 601, a feed roller 602, a document conveying unit 603 and a document discharging portion 604. The document reading unit 500 includes a scanner 501. The feed roller 602 feeds a necessary number of documents set on the document placing portion 601 one by one, and the document conveying unit 603 successively conveys the fed documents to a reading position of the scanner 501. The scanner 501 successively reads images of the documents being conveyed, and the documents having the images thereof read are discharged onto the document discharging portion 604.

The main unit 200 includes a plurality of sheet cassettes 201, a plurality of pickup rollers 202, an image forming unit 33, a discharge port 209, a discharge tray 210, etc. The image forming unit 33 includes a transfer roller 203, a photoconductive drum 204, an exposure device 206, a developing device 207 and a fixing roller 208.

The photoconductive drum 204 is uniformly charged by a charger (not shown) while being rotated in an arrow direction. The exposure device 206 scans a laser beam modulated in accordance with an image of a document read by the document reading unit 500 across a surface of the photoconductive drum 204 to form electrostatic latent image on this surface. The developing device 207 supplies black developer to the photoconductive drum 204 to form a toner image.

On the other hand, the pickup roller 202 picks up a print sheet from the sheet cassette 201 containing print sheets and feeds it to the transfer roller 203. The transfer roller 203 transfers the toner image formed on the surface of the photoconductive drum 204 to the conveyed print sheet, and the fixing roller 208 fixes the transferred toner image to the print sheet by applying heat. Thereafter, the print sheet is carried into the sheet post-processing unit 300 through the discharge port 209 of the main unit 200. Further, the print sheet may be discharged to the discharge tray 210 according to need.

A manual feed tray 220 is a tray provided at a specified position of a side surface of the image forming apparatus 1 and is pivotable about its bottom end as a pivot center between an accommodated position where it is in a substantially upright position parallel to the side surface and a feeding position where it is in an inclined posture with the bottom end slightly inclined downwardly. Sheets are stacked on the upper surface of the manual feed tray 220 and fed toward the photoconductive drum 204 by a pickup roller 221 when the manual feed tray 220 is located at the feeding position.

The sheet post-processing unit 300 includes a carry-in port 301, a print sheet conveying unit 302, a carry-out port 303, a stack tray 304, etc. The print sheet conveying unit 302 successively conveys print sheets brought to the carry-in port 301 through the discharge port 209 and finally discharges the print sheets to the stack tray 304 through the carry-out port 303. The stack tray 304 is so constructed as to be vertically movable in arrow directions according to the number of print sheets carried out through the carry-out port 303.

Figure 3:
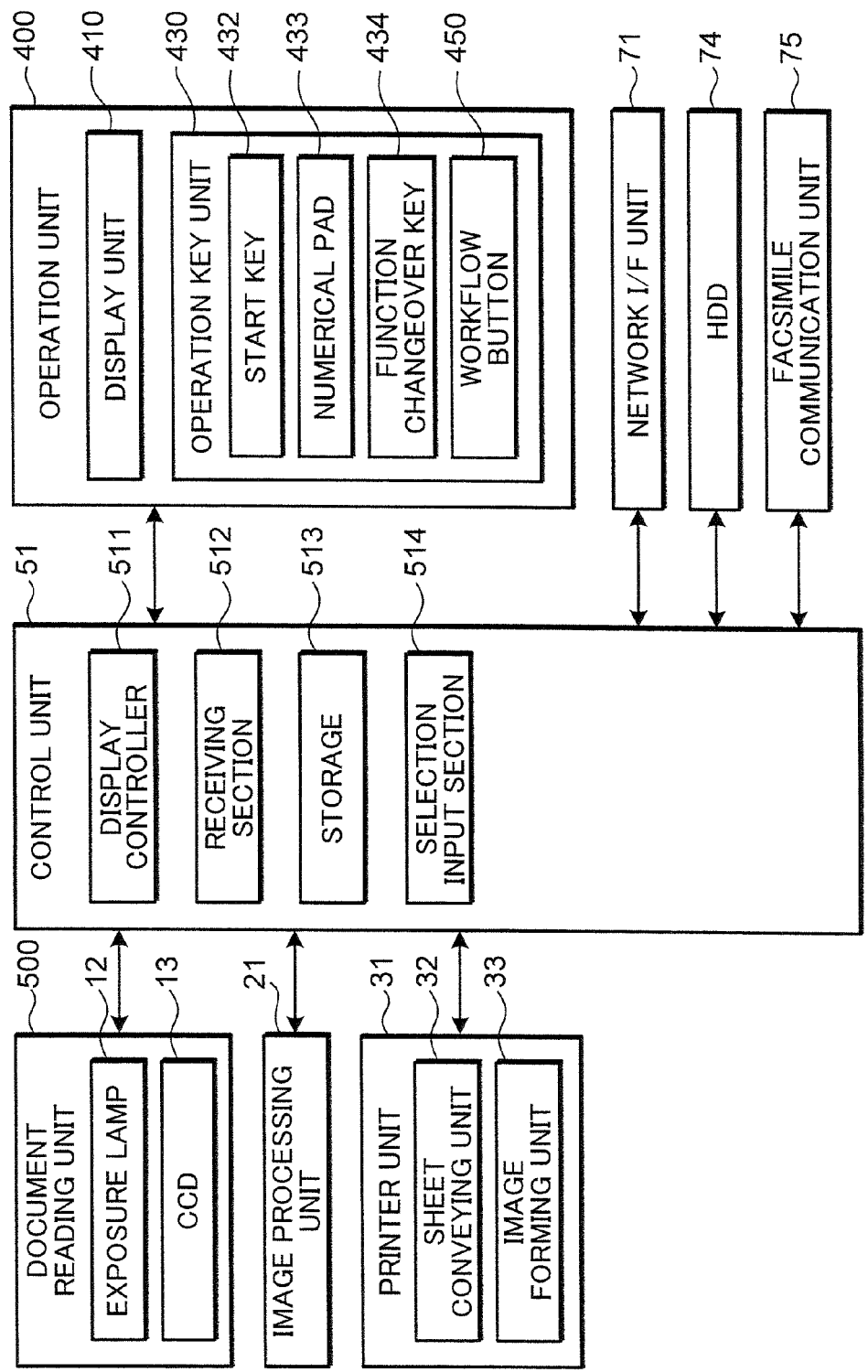
FIG. 3 is a block diagram showing an electrical construction of the image forming apparatus shown in FIG. 1.

FIG. 3 is a control block diagram of the image forming apparatus 1 shown in FIG. 1. As shown in FIG. 3, the image forming apparatus 1 is provided with the document reading unit 500, an image processing unit 21, a printer unit 31, the operation unit 400, a control unit 51, a network I/F (interface) unit 71, an HDD (hard disk drive) 74 and a facsimile communication unit 75.

The document reading unit 500 includes an exposure lamp 12 and a CCD (Charge Coupled Device) 13 constituting the scanner 501 shown in FIG. 1. The document reading unit 500 irradiates a document by the exposure lamp 12 and receives reflected light by the CCD 13 to read an image from the document, and outputs an image corresponding to the read image to the image processing unit 21.

The image processing unit 21 applies various processings including specified correction processings such as a level correction and a γ correction, image compression or expansion and size enlargement or reduction to a read image according to need. An image processed by the image processing unit 21 is stored in an illustrated image memory or output to the printer unit 31.

The printer unit 31 includes a sheet conveying unit 32 composed of the sheet cassettes 201, the pickup rollers 202 and the like shown in FIG. 1, and an image forming unit 33 composed of the photoconductive drum 204, the exposure device 206, the developing device 207, the transfer roller 203, the fixing roller 208 and the like shown in FIG. 1. The printer unit 31 conveys a recording sheet to the image forming unit 33 by the sheet conveying unit 32, forms a toner image corresponding to the above image on the photoconductive drum 204 based on the document data read by the document reading unit 500 by the image forming unit 33, transfers the toner image formed on the photoconductive drum 204 to the recording sheet by the transfer roller 203 and fixes the toner image to the recording sheet by the fixing roller 208, whereby an image is formed.

The network I/F unit 71 controls transmission and reception of various data to and from external apparatuses via a LAN using a network interface (10/100 Base-TX) or the like. The HDD 74 stores images read by the document reading unit 500 and output formats and the like set for these images.

The operation unit 400 includes the display unit 410 and the operation key unit 430 as shown in FIGS. 1 and 2. The display unit 410 displays a plurality of keys for receiving input of various instructions by the touch panel function under the control of the control unit 51. The operation key unit 430 includes the function changeover keys 434, the start key 432, the numerical pad 433, the workflow button 450 and the like shown in FIG. 2. The control unit 51 receives instructions input by the operator from the respective keys of the display unit 410 and the operation unit 400.

The facsimile communication unit 75 includes an encoder/decoder (not shown), a modulator/demodulator (not shown) and an NCU (Network Control Unit: (not shown)). The facsimile communication unit 75 transmits document image data read by the document reading unit 500 to a facsimile machine or the like via a telephone line and receives image data transmitted from a facsimile machine or the like. The encoder/decoder compresses and encodes image data to be transmitted and expands and decodes received image data. The modulator/demodulator modulates compressed and encoded image data into a sound signal and demodulates a received signal (sound signal) into image data. The NCU controls connection with facsimile machines and the like as transmission and reception destinations by the telephone line.

The control unit 51 controls working of the image forming apparatus 1, and includes a RAM (Random Access Memory) having a function for temporarily storing data and a function as a work area, a ROM storing programs beforehand and a CPU for reading the program or the like from the ROM and executing it. The CPU has functions as a display controller 511, a receiving section 512, a storage 513 and a selection input section 514 by executing an image processing program specific to this embodiment and stored in the ROM or the like.

The display controller 511 is for causing the display unit 410 to display reception screens (operation screens) used to set values for respect processing items in the image forming apparatus 1 in a wizard format.

The receiving section 512 is for performing a process of receiving input of set values when the set values are input using the reception screens.

The storage 513 stores various data used to display operation guidance to an operator (particularly in this embodiment, the storage 513 stores display data used to cause the display unit 410 to display reception screens for receiving input of settings needed to be registered for the execution of the functions such as the copying operation and the scanning operation) and image data (including images, characters, symbols and the like) used to display operating conditions and the like of the respective functions such as the scanner function, facsimile function, printer function and copy function.

The storage 513 also stores a plurality of templates (standard forms) each composed of a combination of the respective processing items on the function executable in the image forming apparatus 1. The template is, for example, a combination of the processing items such as the number of copies, sheet size, magnification, density, aggregate print, document image quality and duplex/split applied in each function such as the copying operation.

Each template is used for a workflow for performing a process of guiding a user for the input of the respective settings needed to be registered for the execution of the function such as the copying operation or for a workflow for storing set contents (set values) of the respective processing items applied upon executing the function such as the copying operation and executing the function such as the copying operation with the respective set contents.

The selection input section (first or second selection input section in claims) 514 receives input of an instruction to select a workflow designated by the user out of those stored in the storage 513. The selection input section 514 also receives input of an instruction to select a plurality of workflows. If there exists any overlapping processing item between a first workflow whose selection was previously received and a further second workflow whose selection was received later, the selection input section 514 receives input of an instruction to select whether or not to cause the display unit 410 to display a reception screen for the overlapping processing item out of reception screens relating to the second workflow.

Note that the operating device according to the embodiment of the present invention includes, for example, the display unit 410, the storage 513, the selection input section 514, the display controller 511 and the receiving section 512. Further, the operating device according to the embodiment of the present invention further includes a mode selection input section or an operation input section to be described later according to need.

Figure 4:
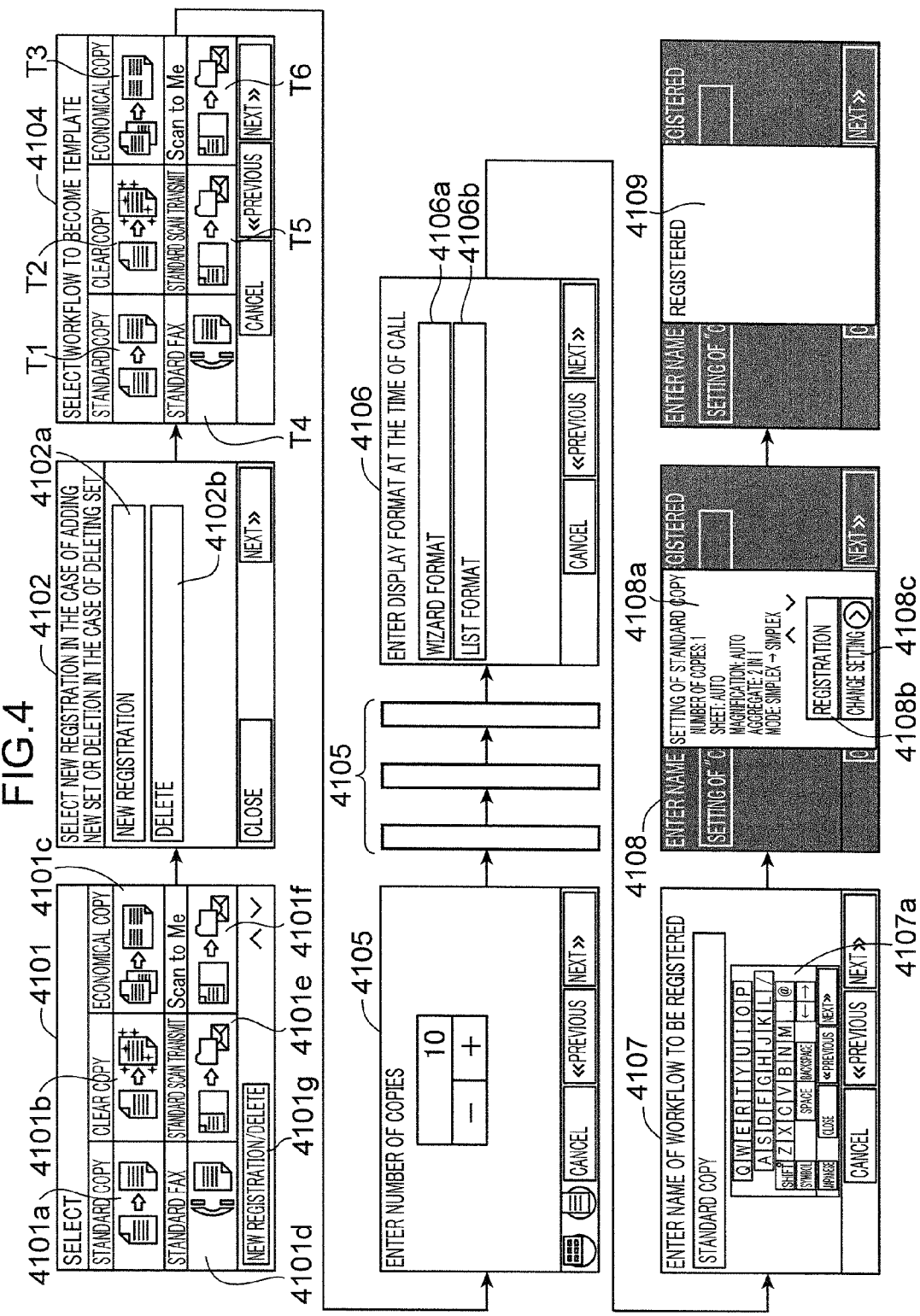
FIG. 4 is a diagram showing a transition of display screens on a display unit at the time of generating and registering a workflow for a copy function.

Next, a process of generating and registering a workflow in the image forming apparatus 1 is described. FIG. 4 is a diagram showing a transition of display screens on the display unit 410 at the time of generating and registering a workflow for the copy function.

As shown in FIG. 4, when a main power supply of the image forming apparatus 1 is turned on by a user and, for example, a copy button is depressed to start the copy function, the display controller 511 causes the display unit 410 to display an unillustrated initial screen.

When the workflow button 450 of the operation unit 400 is depressed by the user during the display of this initial screen and a workflow starting instruction is received by the receiving section 512, the display controller 511 causes a workflow screen 4101 (FIG. 4) to be displayed. This enables the start of an operation of generating and registering the workflow or deleting the workflow. The display controller 511 causes the workflow screen 4101 to display a new registration/deletion button 4101g for receiving new registration/deletion of the workflow from the user.

If the start key 432 and/or the numerical pad 433 and the like are depressed with set contents such as sheet selection and magnification designated by the user on the initial screen or with already set contents to input an instruction to execute the copying operation without the workflow button 450 being depressed by the user during the display of the initial screen (without the workflow starting instruction being received), a normal copying operation is executed in accordance with this depressing operation.

On the other hand, if the new registration/deletion button 4101g is pressed by the user during the display of the workflow screen 4101 by the display controller 511, the display controller 511 causes the display unit 410 to display a workflow registration/deletion screen 4102 (FIG. 4) prompting the user to instruct selection of either workflow new registration or workflow deletion.

A new registration button 4102a for receiving a workflow new registration instruction from the user and a deletion button 4102b for receiving a workflow deletion instruction from the user are displayed on the workflow registration/deletion screen 4102. A process and the like when the deletion button 4102b is pressed are not described.

When the new registration button 4102a is pressed during the display of the workflow registration/deletion screen 4102 and a workflow new registration instruction is received by the receiving section 512 by the touch panel function, the display controller 511 causes the display unit 410 to display a template selection screen 4104 (FIG. 4) prompting selection of the template used for workflow generation. Images T1 to T6 indicating the respective templates usable for workflow generation are displayed on this template selection screen 4104.

When any one of the images T1 to T6 indicating the templates is pressed by the user during the display of this template selection screen 4104 and selection of the template for wizard format display used for workflow generation is received by the receiving section 512 by the touch panel function, the display controller 511 reads the selected template from the storage 513 and causes the display unit 410 to successively display reception screens 4105 for the respective settings of the function indicated by the read template (e.g. in the case of the copy function, number of copies, sheet size, magnification, density, aggregate print, document image quality, duplex/split, etc.) in the wizard format.

The display controller 511 displays the reception screens for all the settings of the function indicated by the read template and repeats a reception screen displaying process and a set content receiving process until designated contents on the respective reception screens are received by the receiving section 512. When the reception screen displaying process and the set content receiving process are completed for all the settings, the display controller 511 causes the display unit 410 to display a display format selection screen 4106 (FIG. 4).

The display controller 511 causes this display format selection screen 4106 to display a wizard format display button 4106a and a list format display button 4106b prompting the user to select either the above wizard format or a list format.

When either one of the wizard format display button 4106a and the list format display button 4106b is pressed by the user during the display of this display format selection screen 4106 and an instruction to select either one of the display formats is received by the receiving section 512, the control unit 51 associates the contents of the respective settings, the display format and the template received by the receiving section 512 with each other. In other words, by this association, a workflow is generated in which displays allowing the user to confirm the contents of the respective settings received by the receiving section 512 are made in the display format received by the receiving section 512 and the function such as the copying operation is executed with the contents of the respective settings, for example, upon executing the function such as the copying operation. This received display format is applied when the reception screens for the respective settings are displayed in a process of calling a workflow to be described later.

Subsequently, the display controller 511 causes the display unit 410 to display an input screen 4107 for the name of this generated workflow. A keyboard image 4107a and the like are displayed on this input screen 4107, so that the user can press the keyboard image to enter the workflow name by the touch panel function.

When the workflow name is entered by the user through the operation of the input screen 4107, the display controller 511 causes the display unit 410 to display a confirmation screen 4108 including an image 4108a displaying a list of the names of the processing items received on the respective reception screens 4105 and the set values for the processing items with the related name and set value juxtaposed, a registration button 4108b for receiving an instruction to register with the respective list-displayed processing items, and a change button 4108c for receiving an instruction to change the contents of the respective list-displayed processing items.

When the registration button 4108b is pressed by the user during the display of this confirmation screen 4108 and an instruction to register with the respective list-displayed processing items is received by the receiving section 512, the control unit 51 causes the customized template to be stored in the storage 513. Note that, thereafter, the display controller 511 causes the display unit 410 to display a registration completion screen 4109 to notify registration completion to the user.

When the change button 4108c is pressed by the user during the display of the confirmation screen 4108 and a setting change instruction to change the list-displayed contents of the respective settings is received by the receiving section 512, the display controller 511 returns to the process of causing the display unit 410 to successively display the respective reception screens for the respective settings of the function indicated by the template whose selection was previously received (e.g. in the case of the copy function, number of copies, sheet size, magnification, density, aggregate print, document image quality, duplex/split, etc.).

Figure 5:
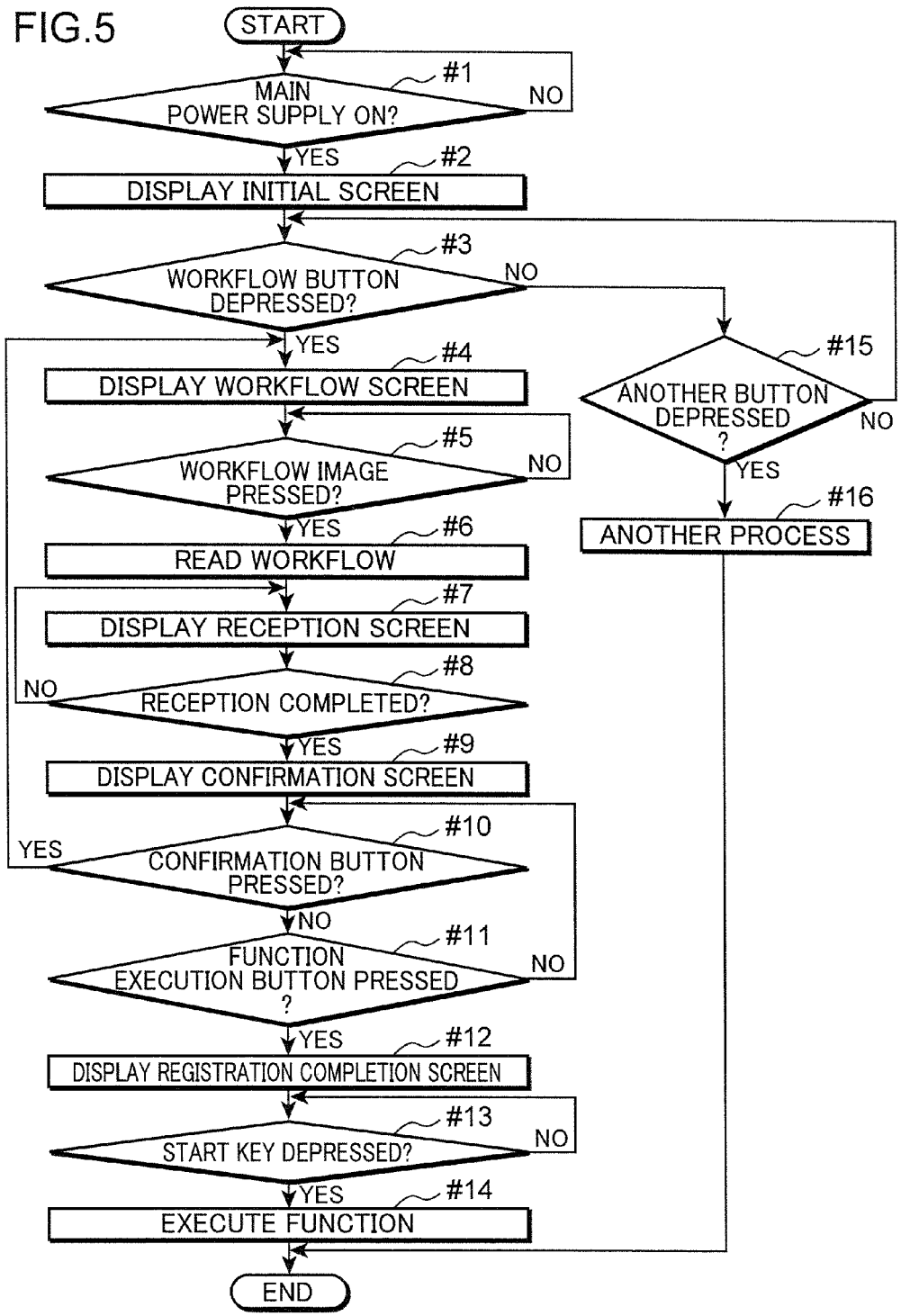
FIG. 5 is a flow chart showing a process at the time of calling a workflow for causing the copy function to be displayed in a wizard format.
Figure 6:
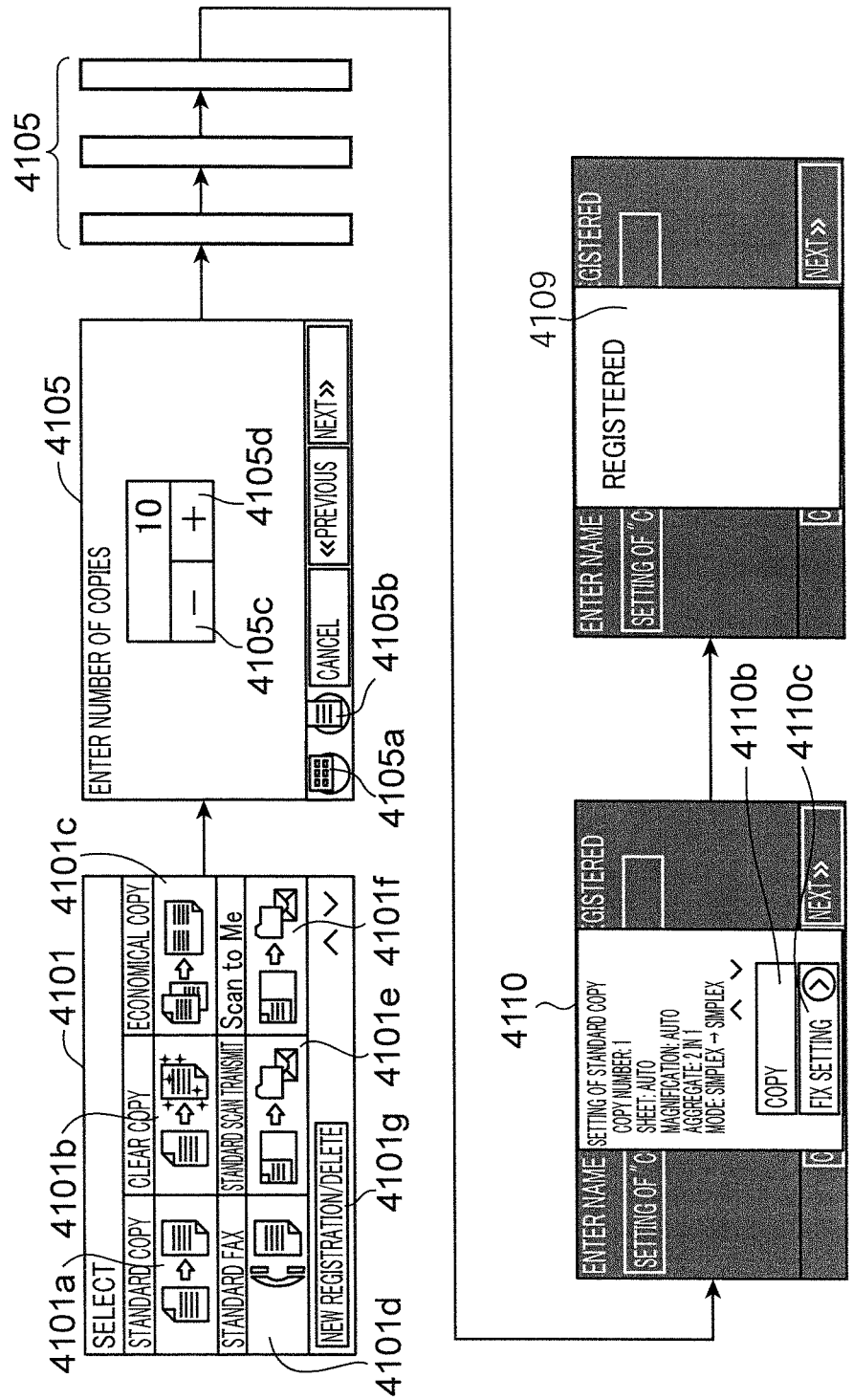
FIG. 6 is a diagram showing a transition of display screens at the time of calling the workflow for causing the copy function to be displayed in the wizard format.

Next, a process of calling and reconfiguring a workflow in the image forming apparatus 1 is described. FIG. 5 is a flow chart showing a process at the time of calling a workflow to be displayed in the wizard format for the copy function. FIG. 6 is a diagram showing a transition of display screens at the time of calling the workflow to the displayed in the wizard format for the copy function.

When the main power supply of the image forming apparatus 1 is turned on by a user (YES in Step #1), the display controller 511 causes the display unit 410 to display the unillustrated predetermined initial screen (Step #2).

When a button of the operation unit 400 other than the workflow button 450 is depressed during the display of this initial screen (NO in Step #3, YES in #15), the control unit 51 performs another process corresponding to this button (Step #16). On the other hand, when the workflow button 450 is pressed by the user and a workflow starting instruction is received by the receiving section 512 (YES in Step #3), the display controller 511 causes a workflow screen 4101 (FIG. 6) to be displayed (Step #4). Workflow images 4101a to 4101f indicating the respective workflows stored (registered) in the storage 513 are displayed on the workflow screen 4104.

When any one of the workflow images 4104a to 4104f displayed on the workflow screen 4101 is pressed by the user during the display of the workflow screen 4101 and a workflow selection instruction to select a workflow applied for the execution of the function (e.g. copying operation) of the image forming apparatus 1 is received by the receiving section 512 from the user (YES in Step #5), the display controller 511 reads this selected workflow from the storage 513 (Step #6).

Here, if the display format corresponding to this workflow is the wizard format, the display controller 511 causes the display unit 410 to successively display reception screens (e.g. reception screens 4105 shown in FIG. 6) for the respective settings of the function indicated by the read template (e.g. in the case of the copy function, number of copies, sheet size, magnification, density, aggregate print, document image quality, duplex/split, etc.) (Step #7).

When content designation (e.g. specific number of copies) on the processing item guided on the reception screen is received the receiving section 512 by the touch panel function based on the operation of an operation button displayed on the reception screen or the numerical pad 433 or the like by the user, the set content is set to the designated content (set value).

The display controller 511 repeats the reception screen displaying process and the set content receiving process until the reception screens for all the processing items of the function indicated by the read template are displayed. When the reception screen displaying process and the set content receiving process are completed for all the processing items relating to the workflow (YES in Step #8), the display controller 511 causes the display unit 410 to display an image listing the set contents received up to this point of time, a function execution button 4110b(FIG. 6) for receiving a function executing instruction to execute the function with the list-displayed contents of the respective settings and a fix button 4110c (FIG. 6) for receiving an instruction to fix the list-displayed contents of the reception screen settings.

Here, in this embodiment, the processings in Steps #4 to #9 are repeated if the fix button 4110c is pressed (YES in Step #10). Specifically, the display controller 511 causes the display unit 410 to display the workflow screen 4101 again (Step #4) to set a state where an instruction to further select a second workflow out of the respective workflows displayed as the workflow images 4101a to 4101f can be received from the user (to wait on standby until any one of the workflow images 4101a to 4101f is pressed), and the receiving section 512 receives input of set values for the respective processing items by the user on the respective reception screens for the further selected second workflow after the further selection of the workflow is received by the receiving section 512 (#7, #8).

When the receiving section 512 receives the input of the set values using the respective reception screens for the further second workflow, the receiving section 512 receives the received set values and the set values input using the respective reception screens relating to the previously selected first workflow as set values applied for a series of functions as a combination of the further selected second workflow and the previously selected first workflow. The series of functions as the combination of the further second workflow and the previously selected first workflow received by the receiving section 512 in this way are stored in the storage 513 in correspondence with the above set values applied for these functions.

For example, it is assumed that the workflow named "CLEAR COPY" is selected by pressing the workflow image 4101b on the workflow screen 4101 shown in FIG. 6 by a certain user and received by the selection input section 514 and the display format of the respective reception screens 4105 relating to the workflow corresponding to this workflow image 4101b is set at the wizard format. It is further assumed that the respective reception screens 4105 are those for processing items A to E as shown in FIG. 7.

In this case, the display controller 511 causes the display unit 410 to display the respective reception screens 4105 for the processing items A to E in the wizard format and the receiving section 512 receives input of the set values on the respective reception screens 4105 for the processing items A to E. Then, the display controller 511 causes the display unit 410 to display the confirmation screen 4110. When the fix button 4110c is pressed, the display controller 511 causes the display unit 410 to display the workflow screen 4101 again.

Figure 7:
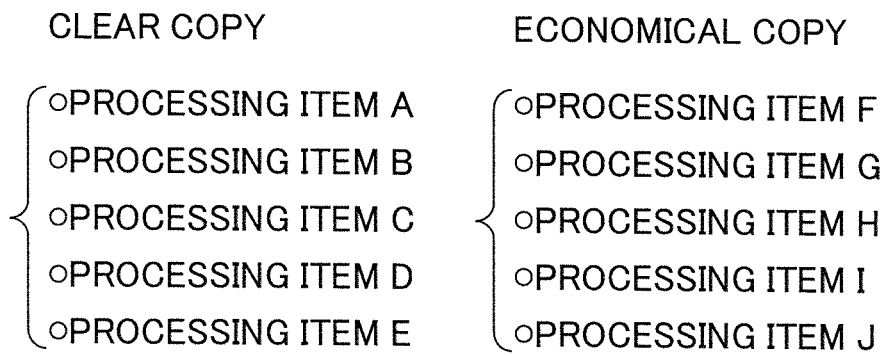
FIG. 7 is a diagram showing processing items relating to workflows named "CLEAR COPY" and "ECONOMICAL COPY" on a workflow screen shown in FIG. 4.

Further, it is assumed that the user selects the workflow named "ECONOMICAL COPY" on this workflow screen 4101 by pressing the workflow image 4101c, this selection is received by the selection input section 514, the display format of the respective reception screens 4105 relating to this workflow image 4101c is set at the wizard format and the respective reception screens 4105 are those for the processing items F to H as shown in FIG. 7.

A series of functions as the combination of the workflow named "CLEAR COPY" and the workflow named "ECONOMICAL COPY" received by the receiving section 512 are stored in the storage 513 in correspondence with the set values received on the respective reception screens 4105 for the processing items F to H and those received on the respective reception screens 4105 for the processing items A to E.

The control unit 51 repeatedly performs the above process until the function execution button 4110b is pressed on the confirmation screen 4110 (while the fix button 4110c is pressed on the confirmation screen 4110; NO in Step #11).

Thereafter, when the function execution button 4110b is pressed on the confirmation screen 4110 and an instruction to execute the function with the list-displayed contents of the respective settings is received by the receiving section 512 (YES in Step #11), the display controller 511 causes the display unit 410 to display the registration completion screen 4109 to notify that registration of the list-displayed contents of the respective settings has been completed (Step #12) and the control unit 51 waits on standby until a function execution instruction is entered by the start key 432 (NO in Step #13). When the function execution instruction is entered by the start key 432 (YES in Step #13), the control unit 51 executes the series of functions as the combination of the first and second workflows received by the receiving section 512 and stored in the storage 513 at this point of time based on the already set values applied for the respective processing items of the series of functions (Step #14).

FIG. 8 is a diagram showing a transition of display screens at the time of calling a workflow for causing the copy function to be displayed in the list format.

If the display format corresponding to the workflow indicated by the workflow image pressed by the user out of the workflow images 4101a to 4101f displayed on the workflow screen 4101 during the display of the workflow screen 4101 is the list format, the display control unit 511 cause the display unit 410 to displays a confirmation screen (e.g. reception screen shown in FIG. 8) 4110 for the respective settings of the function indicated by this read workflow (e.g. in the case of the copy function, number of copies, sheet size, magnification, density, aggregate print, document image quality, duplex/split, etc.) as shown in FIG. 8.

When content designation (e.g. specific number of copies) on the processing item guided on the reception screen is received by the touch panel function based on the operation of an operation button displayed on the confirmation screen 4110 or the numerical pad 433 or the like by the user, the set content is set to the designated content (set value).

Also on this confirmation screen 4110, similar to the confirmation screen 4110 shown in FIG. 6, the display controller 511 causes the display unit 410 to display the workflow screen 4101 until the function execution button 4110b and the fix button 4110c are displayed and the function execution button 4110b is pressed on the confirmation screen 4110 (while the fix button 4110c is pressed on the confirmation screen 4110). When the function execution button 4110b is pressed on the confirmation screen 4110 and an instruction to execute the copy function is received by the receiving section 512, the display controller 511 causes the display unit 410 to display a notification screen 4120 showing the start of execution of the function.

As described above, in this embodiment, an input operation of the set values for the processing items relating to the other second workflow is still enabled even after an input operation of the set values for the processing items relating to the first workflow is finished, i.e. an input operation of set values can be successively performed for processing items relating to a plurality of workflows, and the series of functions as the combination of the functions indicated by the selected first and second workflows and the set values for the processing items relating to the received first and second workflows are stored in the storage 513. Thus, operability and convenience when a user utilizes workflows are improved, for example, as compared with the cases where another workflow cannot be selected after selection of one workflow is finished and set values for processing items relating to another workflow cannot be input even if the input of set values for processing items relating to one workflow is completed.

In addition to or instead of the above embodiment, the present invention may be embodied as follows.

(1) When input operations of set values can be successively performed for processing items relating to a plurality of workflows and the set values for the respective processing items input by the respective input operations are received as those indicating a series of functions as in the above embodiment, there are cases where the processing item relating to the previously selected workflow and that relating to the later selected workflow overlap. In such cases, the following process may be employed.

For example, the display controller 511 may omit the display of the reception screen for the overlapping processing item at the time of inputting the set values for the processing items relating to the later selected second workflow (called modification (1)). For example, if a certain processing item P is included both in the previously selected first workflow and the later selected second workflow, the display controller 511 causes the reception screen for the processing item P to be displayed at the time of setting for the previously selected first workflow, but skips the display of this reception screen at the time of setting for the later selected second workflow.

According to this modification (1), unnecessary overlapping display can be omitted during the display of the reception screens relating to the workflows and it can be avoided to burden the user with performing an operation of inputting set values for the same processing item a plurality of times.

Besides the above modification (1), if there exists any processing item overlapping between the previously selected first workflow and the later selected second workflow, the reception screen for the overlapping processing item may be excluded from the first workflow and the display unit 410 may display the reception screens relating to the later selected second workflow including the reception screen for the overlapping processing item when the set value received on the reception screen relating to the previously selected first workflow differs from the set value stored in the storage 513 beforehand as the set value for this processing item in the later selected second workflow (called modification (2)).

For example, if a certain processing item P is included in both the previously selected first workflow and the later selected second workflow, the reception screen for the overlapping processing item P is excluded from the first workflow and the display unit 410 displays the reception screens relating to the later selected second workflow including the one for the overlapping processing item P when a value set beforehand in the later selected second workflow is P1 and a value is set at P2 different from P1 on the reception screen relating to the previously selected first workflow for this processing item P.

This mode takes into account that a user may desire a change of a set value in connection with set values for other processing items during a period between the input of set values on the reception screens relating to the previously selected first workflow and the input of set values on the reception screens relating to the later selected second workflow and, hence, the set values input on the reception screens relating to the later selected second workflow are often more desired by the user than those input on the reception screens relating to the previously selected first workflow. By performing the above process, the user can confirm whether or not the set value for the overlapping processing item P is proper.

Besides the above modifications (1) and (2), the following mode may be employed, taking into account that the set value for the overlapping processing item may need to be changed in connection with set values for other processing items or the like during the period between the input of the set values on the reception screens relating to the previously selected first workflow and the input of the set values on the reception screens relating to the later selected second workflow and, hence, the set values input on the reception screens relating to the later selected second workflow are often more desired by a user than those input on the reception screens relating to the previously selected first workflow. When the display format of the reception screens relating to the previously selected first workflow is the wizard format and that of the reception screens relating to the later selected second workflow is the list format in the case where there exists any processing item overlapping between the previously selected first workflow and the later selected second workflow, the receiving section 512 invalidates the set value input on the reception screen relating to the previously selected first workflow and validates the set value input on the reception screen relating to the later selected second workflow for the overlapping processing item (called modification (3)).

Besides the modifications (1) to (3), the following modification (4) may also be supposed. Specifically, in the list format display, respective set values for a plurality of processing items are displayed side by side, and it is thought that not much attention is paid upon confirming the set values for the respective processing items. Accordingly, if the display controller 511 causes the display unit 410 to display the reception screen for the overlapping processing item in the wizard format (called modification (4)), the set value for the overlapping processing item can be confirmed with more attention since the reception screen is displayed for each processing item in the wizard format.

By further modifying the modification (4), the display controller 511 may cause the display unit 410 to display not only the reception screen for the overlapping processing item in the wizard format, but all the reception screens for the respective processing items relating to the later selected second workflow in the wizard format if the same processing item exists in the previously selected workflow and the later selected workflow (called modification (5)).

Besides the modifications (1) to (5), as another construction in the case where there exist any processing item overlapping between the previously selected first workflow and the later selected second workflow, the display controller 511 may cause the display of a setting screen used to select whether or not to display the reception screen for the overlapping processing item on the display unit 410 during the display of the reception screens in the later selected second workflow, an instruction for this selection may be received by the receiving section 512, and the operation unit 400 or the like may additionally include an input operation section (second selection input section in claims, the selection input section 514 may function as the second selection input section) for receiving this selection instruction from the user using the setting screen (called modification (6)).

This enables the user to select whether or not the reception screen relating to the later selected second workflow is to be displayed if there exists any processing item overlapping between the previously selected first workflow and the later selected second workflow.

The image forming apparatus 1 has display modes corresponding to the operations mentioned in the respective modifications (1) to (6), the display controller 511 causes the display of a mode selection screen used to select a desired display mode out of the respective display modes, this selection instruction is received by the receiving section 512, the operation unit 400 or the like additionally includes an input operation section for receiving the selection instruction from a user using the mode selection screen, and the display controller 511 controls whether or not to display a reception screen relating to the second workflow in accordance with the selection instruction. In this way, the user may be enabled to select a desired display mode as to whether or not to display the reception screen relating to the second workflow by using the receiving section 512 or the input operation section as a mode selection input section (third selection input section in claims, the selection input section 514 may function as the third selection input section).

It should be appreciated that the present invention is not limited to the above embodiment and modifications and can be further modified in various manners. The construction and processes shown in FIGS. 1 to 8 are merely illustration of the embodiment according to the present invention and not of the nature to limit the present invention to the above embodiment.

This application is based on Japanese Patent application serial No. 2010-038958 filed in Japan Patent Office on Feb. 24, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   a control unit that controls working of the image forming apparatus; and
   an operating device, the operating device comprising:
   a display unit; and
   a storage that previously stores workflows, each of the workflows being composed of a combination of a predetermined plurality of processing items out of a plurality of processing items of the image forming apparatus, each of the workflows is a distinct lob that is capable of executing by the image forming apparatus individually and separately from each other workflow, the operating device further comprising:

a first selection input section that inputs selection of a workflow designated by a user out of the workflows previously stored in the storage;

a display controller that reads the workflow selected in the first selection input section from the storage and causes the display unit to successively display a plurality of reception screens used to input respective set values for a plurality of processing items composing the workflow in a wizard format; and a receiving section that receives set values when the set values are input using the respective reception screens that are displayed successively in the wizard format and relate to the workflow selected in the first selection input section, wherein the first selection input section receives input of selection of a further workflow after the receiving section completes the reception of the input of the set values on the respective reception screens relating to the workflow selected in the first selection input section;

a workflow previously selected in the first selection input section is a first workflow, and a workflow further selected in the first selection input section is a second workflow, wherein the first workflow is distinct and separately executable from the second workflow, wherein the first workflow is distinct and separately executable from the second workflow;

when set values are input using respective reception screens that are displayed successively in the wizard format and relate to the second workflow, the receiving section receives these set values and the set values input using the respective reception screens that are displayed successively in the wizard format and relate to the first workflow as a first receiving that receives set values applied for a series of functions as a combination of the second workflow and the first workflow;

the display controller performs a first displaying process skipping the displaying of the reception screen for a repeated processing item in the first workflow whose set value is different, but the reception screen for the repeated processing item in the second workflow whose set value is different upon displaying the reception screens relating to the first and second workflows on the display unit when the set value set on the reception screen relating to the first workflow is different from the set value set on the reception screen relating to the second workflow for the repeated processing item when there exists any repeated processing item between the first workflow and the second workflow;

the display controller causes the display unit to successively display reception screens for the respective processing items at settings of the first workflow and the second workflow when there does not exist any repeated processing items; and the control unit (a) executes a function of the first workflow when an execution of function of the first workflow is instructed after the receiving section completes the reception of the input of the set values on the respective reception screens relating to the first workflow, (b) executes the series of functions when an execution of the series of functions is instructed after the receiving section receives the first receiving.

2. The image forming apparatus according to claim 1, wherein:

the display controller performs a second displaying process of causing the display unit to display the reception screens excluding the one for ping a repeated processing item when the display unit displays the reception screens relating to the second workflow when there exists any repeated processing item between the first workflow and the second workflow; and the display controller causes the display unit to successively display reception screens for the respective processing items at settings of the first workflow and the second workflow when there does not exist the repeated processing item.

3. The image forming apparatus according to claim 1, further comprising a second selection input section for, when there exists any repeated processing item between the first workflow and the second workflow, selecting whether or not to cause the display unit to display the reception screen for the repeated processing item out of the reception screens relating to the second workflow, wherein:

the display controller performs a second displaying process of causing the display unit to display the reception screens relating to the second workflow including the one for the repeated processing item when an instruction to the effect of causing the display unit to display the reception screen relating to the second workflow is selected by the second selection input section and causing the display unit to display the reception screens relating to the second workflow excluding the one for the repeated processing item when an instruction to the effect of not causing the display unit to display the reception screen relating to the second workflow is selected by the second selection input section; and the display controller causes the display unit to successively display reception screens for the respective processing items at settings of the first workflow and the second workflow when there does not exist the repeated processing item.

* * * * *